US012746160B1

(12) United States Patent
Huttner et al.

(10) Patent No.: US 12,746,160 B1
(45) Date of Patent: Sep. 29, 2026

(54) VACUUM BAG WITH INTEGRAL CUSTOMIZABLE HEAD POSITIONER

(71) Applicant: MEDTEC LLC, Orange City, IA (US)

(72) Inventors: James Huttner, Sylvania, OH (US); Cody Harder, Perrysburg, OH (US); Susan Brangham, Temperance, MI (US)

(73) Assignee: MEDTEC LLC, Orange City, IA (US)

( * ) Notice: Subject to any disclaimer, the term of this patent is extended or adjusted under 35 U.S.C. 154(b) by 0 days.

(21) Appl. No.: 19/080,249

(22) Filed: Mar. 14, 2025

Related U.S. Application Data

(60) Provisional application No. 63/565,552, filed on Mar. 15, 2024.

(51) Int. Cl.
*A61G 7/057* (2006.01)
*A47C 27/08* (2006.01)
*A61G 13/12* (2006.01)

(52) U.S. Cl.
CPC ........ *A61G 7/05753* (2013.01); *A47C 27/086* (2013.01); *A61G 7/05738* (2013.01); *A61G 13/121* (2013.01); *A61G 2203/70* (2013.01)

(58) Field of Classification Search
CPC ............ A61G 7/05753; A61G 7/05738; A61G 7/057; A61G 13/121; A61G 13/1205; A61G 13/12; A61G 2203/70; A47G 9/10; A47C 7/383; A47C 7/38; A47C 7/36; A47C 27/086; A47C 27/08; Y10S 5/911
USPC ... 5/621, 622, 636, 637, 640, 644, 645, 654, 5/655.4, 702, 911
See application file for complete search history.

(56) References Cited

U.S. PATENT DOCUMENTS 3,745,998 A * 7/1973 Rose ........................ A61F 5/055 5/625
3,762,404 A * 10/1973 Sakita ................ A61G 7/05753 5/655.4
4,045,830 A * 9/1977 Loeb ........................ A61G 1/00 5/81.1 T
4,657,003 A * 4/1987 Wirtz .................. A61F 5/05833 128/869
5,832,550 A * 11/1998 Hauger ................ A61B 6/0421 5/640
5,906,205 A * 5/1999 Hiebert .................. A61G 13/12 128/845
6,226,820 B1 * 5/2001 Navarro ............... A47C 27/088 5/655.4
6,308,353 B1 10/2001 Van Steenburg
(Continued)

*Primary Examiner* — Robert G Santos
(74) *Attorney, Agent, or Firm* — Snyder, Clark, Lesch & Chung, LLP

(57) ABSTRACT

A vacuum cushion for positioning a patient for a procedure includes a gas-impermeable outer covering within which an airtight chamber is defined, a source of negative pressure, and a vacuum control valve providing selective fluid communication between the chamber and the source of negative pressure. A first plurality of filler beads is contained within the airtight chamber in selective fluid communication with the source of negative pressure. A separate gas-permeable bag is provided within the airtight chamber and contains a second plurality of filler beads, the gas-permeable bag being sized, configured, and positioned so as to be useable as a customizable patient headrest. A method of positioning a patient for a medical procedure utilizing the vacuum patient positioning cushion is also provided.

15 Claims, 3 Drawing Sheets

(56) References Cited

U.S. PATENT DOCUMENTS

| | | | | |
|---|---|---|---|---|
| 8,469,911 B2 * | 6/2013 | Hiebert | A61G 13/1275 | 128/845 |
| 8,555,890 B2 * | 10/2013 | Hiebert | A61G 13/121 | 128/845 |
| 8,636,680 B2 * | 1/2014 | Hiebert | A61G 13/1265 | 128/845 |
| 8,671,479 B2 | 3/2014 | Huttner et al. | | |
| 8,690,806 B2 * | 4/2014 | Hiebert | A61F 5/05833 | 128/845 |
| 8,690,807 B2 * | 4/2014 | Hiebert | A61G 13/1255 | 128/845 |
| 9,205,014 B1 * | 12/2015 | Nesley | A61G 13/1215 | |
| 9,510,986 B2 * | 12/2016 | Nesley | A61G 13/1215 | |
| 9,549,865 B2 * | 1/2017 | Hiebert | A61G 13/1255 | |
| 10,206,843 B2 * | 2/2019 | Hiebert | A61G 13/125 | |
| 10,391,014 B2 * | 8/2019 | Hiebert | A61F 5/3776 | |
| 2011/0047706 A1 * | 3/2011 | Hiebert | A61F 5/3776 | 5/621 |
| 2011/0126355 A1 * | 6/2011 | Hiebert | A61G 13/1255 | 5/621 |
| 2011/0191960 A1 * | 8/2011 | Hiebert | A61G 13/1255 | 5/615 |
| 2011/0271451 A1 * | 11/2011 | Huttner | A61G 7/05753 | 5/630 |
| 2013/0192608 A1 * | 8/2013 | Hiebert | A61G 13/1275 | 128/845 |
| 2013/0206148 A1 * | 8/2013 | Hiebert | A61G 13/123 | 128/845 |
| 2014/0208513 A1 * | 7/2014 | Hiebert | A61F 5/3769 | 5/621 |
| 2015/0007828 A1 * | 1/2015 | Hiebert | A61G 13/121 | 128/845 |
| 2016/0089293 A1 * | 3/2016 | Nesley | A61G 13/121 | 5/644 |
| 2017/0095388 A1 * | 4/2017 | Hiebert | A61G 13/1265 | |

* cited by examiner

VACUUM BAG WITH INTEGRAL CUSTOMIZABLE HEAD POSITIONER

BACKGROUND OF THE INVENTION

Supine positioning is commonly used for patients undergoing a course of radiation therapy for breast cancer. The patient is placed in a semi-recumbent position with the torso elevated at some angle (generally 30 to 40 degrees) by the use of a wing-board.

The wing-board features side panels that help support the patient's shoulders, and often also includes a T-bar hand grip to help provide support for keeping the arms elevated away from the chest. The wing-board usually also features some sort of headrest support, either in the form of a Moldcare™ custom foam headrest, commercially available from Alcare Co., Ltd. of Tokyo, Japan. a Timo cushion, or a Silverman thermoform.

It is also often desirable to use some sort of vacuum bag patient positioning device overlaying the wing-board (and headrest). When evacuated, the vacuum bag conforms to patient anatomy providing comfort, enhanced support, and superior accuracy in re-positioning the patient for subsequent treatment sessions.

The final positioning assembly thus includes a wing-board (with or without hand grip), headrest of some sort, and vacuum bag patient positioner. This is a cumbersome assembly with several potential problems. First, the assembly includes multiple parts, all of which must be carefully maintained and stored to ensure proper re-positioning of the patient for each treatment session. Second, there is the possibility of headrest "stack-up", where multiple pieces—e.g., Silverman+Moldcare™+vacuum bag—lead to the possibility of slippage and loss of treatment accuracy. Lastly, the need to use multiple components is time-consuming, labor-consuming, and expensive, as customizable components such as the Moldcare™ headrest are costly.

SUMMARY OF THE INVENTION

The invention is a vacuum cushion for positioning a patient for a procedure includes a gas-impermeable outer covering within which an airtight chamber is defined, a source of negative pressure, and a vacuum control valve providing selective fluid communication between the chamber and the source of negative pressure. A first plurality of filler beads is contained within the chamber in selective fluid communication with the source of negative pressure. A separate gas-permeable bag is provided within the airtight chamber defined by the gas-impermeable outer covering, the separate gas-permeable bag contains a second plurality of filler beads. The first plurality of filler beads is contained within the gas-impermeable outer covering but are kept outside of the gas-permeable bag. The gas-permeable bag sized, configured, and positioned so as to be useable as a customizable patient headrest.

In another aspect of the invention, a method of positioning a patient for a medical procedure is provided. The method includes providing a vacuum patient positioning cushion comprising a gas-impermeable outer covering defining an airtight chamber; a vacuum control valve providing selective fluid communication between the chamber and a source of negative pressure; a first plurality of filler beads provided within the chamber; and a separate gas-permeable bag having a second plurality of filler beads contained therein and being in fluid communication with the rest of the airtight chamber. The patient is placed atop the vacuum cushion such that the patient's head is resting atop the gas-permeable bag, the vacuum control valve is connected to the source of negative pressure, and the vacuum cushion is evacuated while forming the second plurality of filler beads within the gas-permeable bag to act as a headrest for the patient. The remainder of the vacuum cushion is evacuated while forming the first plurality of filler beads to conform to a portion of the patient's anatomy.

BRIEF DESCRIPTION OF THE DRAWINGS

The advantages of the invention will become readily apparent to those skilled in the art from the following detailed description of various embodiments when considered in the light of the accompanying drawings, in which.

DETAILED DESCRIPTION OF THE INVENTION

Figure 1:
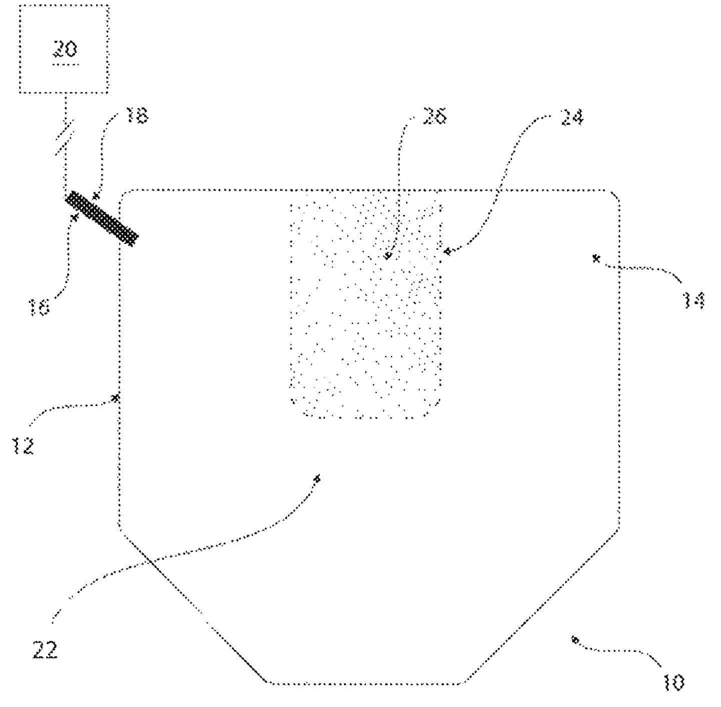
FIG. 1 shows a planar, schematic view of a preferred embodiment of the vacuum patient positioning cushion of the invention.

It is to be understood that the specific devices and processes illustrated in the drawings and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

Referring to the figures, the vacuum patient positioning cushion 10 of a preferred embodiment of the invention is illustrated. The patient positioning cushion 10 is shown as having a generally "home-plate" shape to conform to a standard radiation therapy wing-board. However, it is understood by those versed in the art that different contours may be used without detracting from the intent of the invention. The patient positioning cushion 10 is formed with a gas-impermeable outer covering 12 that defines an airtight chamber 14.

A valve stem 16 having a selectively closeable valve 18 is secured to the patient positioning cushion 10, extending through the outer covering 12 to provide selective fluid communication to the airtight chamber defined by the outer covering 12. The valve stem 16 is connected to a source of negative pressure 20, such as a vacuum pump, and used to selectively provide fluid communication between the source of negative pressure 20 and the airtight chamber 14, allowing for the evacuation of the airtight chamber 14.

Figure 2:
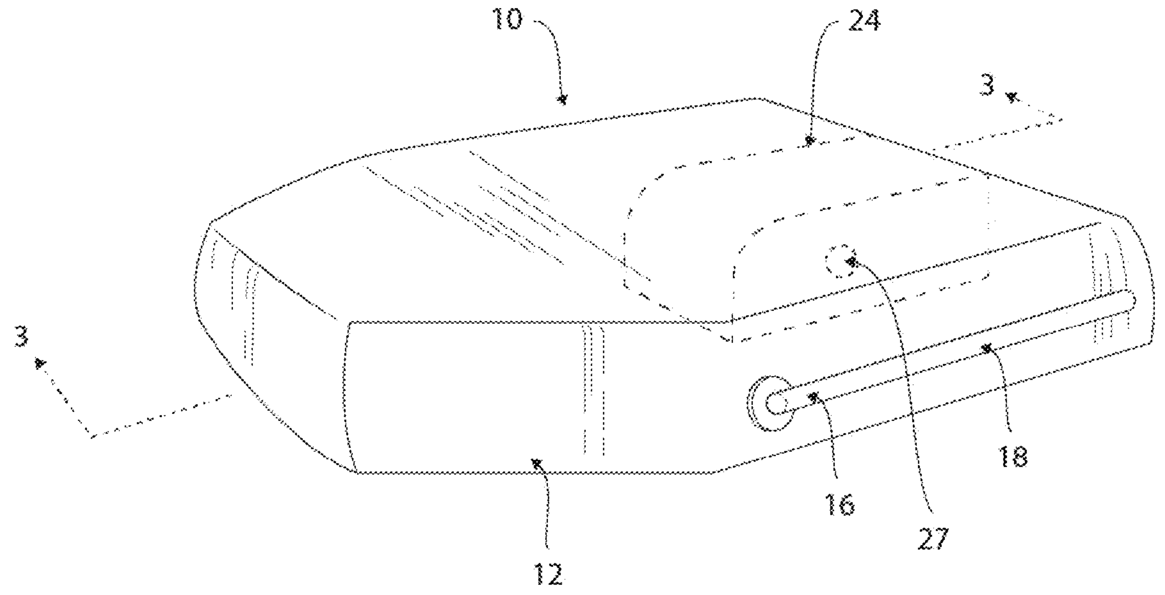
FIG. 2 shows an isometric view of the vacuum patient positioning cushion of FIG. 1.

A first plurality of filler beads 22 is provided within the airtight chamber 14. The first plurality of filler beads 22 is preferably formed of a plurality of polymeric beads, most preferably a plurality of expanded polystyrene beads. The filler beads 22 are not shown in FIG. 2 for ease of illustration. The fill rate for the filler beads 22 may vary, depending on the positioning requirements of the particular patient positioning cushion 10.

A separate gas-permeable bag 24 is provided within the airtight chamber 14 defined by the outer covering 12. In the embodiment illustrated in the drawings, the gas-permeable bag 24 is positioned superior-centrally inside the airtight chamber 14 and is sized and configured so as to be useable as a customizable patient headrest. The gas-permeable bag 24 may be made entirely from a material that is permeable to air but will retain the second plurality of filler beads 26 therewithin. Alternatively, the gas-permeable bag 24 may be formed of a gas-impermeable material and provided with at least one gas-permeable portion, such as the mesh screen 27 shown in FIG. 2. The mesh screen 27 provides fluid communication between the airtight chamber 14 and the interior of the gas-permeable bag, while retaining the second plurality of filler beads 26 within the gas-permeable bag 24 and preventing any of the first plurality of filler beads 22 from entering the gas-permeable bag 24.

The gas-permeable bag 24 is thus within and in fluid communication with the airtight chamber 14. A second plurality of filler beads 26 is provided within the gas-permeable bag 24, the filler beads 26 preferably comprising a plurality of polymeric beads, more preferably comprising a plurality of expanded polystyrene beads. The first plurality of filler beads 22 is contained within the gas-impermeable outer covering 12 but are kept outside of the gas-permeable bag 24. The gas-permeable bag 24 prevents the filler beads 26 therewithin from shifting within the airtight chamber 14 of the patient positioning cushion 10. When the airtight chamber 14 is in fluid communication with the source of negative pressure 20 and evacuated, the filler beads 26 within the gas-permeable bag 24 remain in place and are able to conform and mold to the patient's head anatomy, forming an integral, custom headrest within the patient positioning cushion 10.

Figure 3:
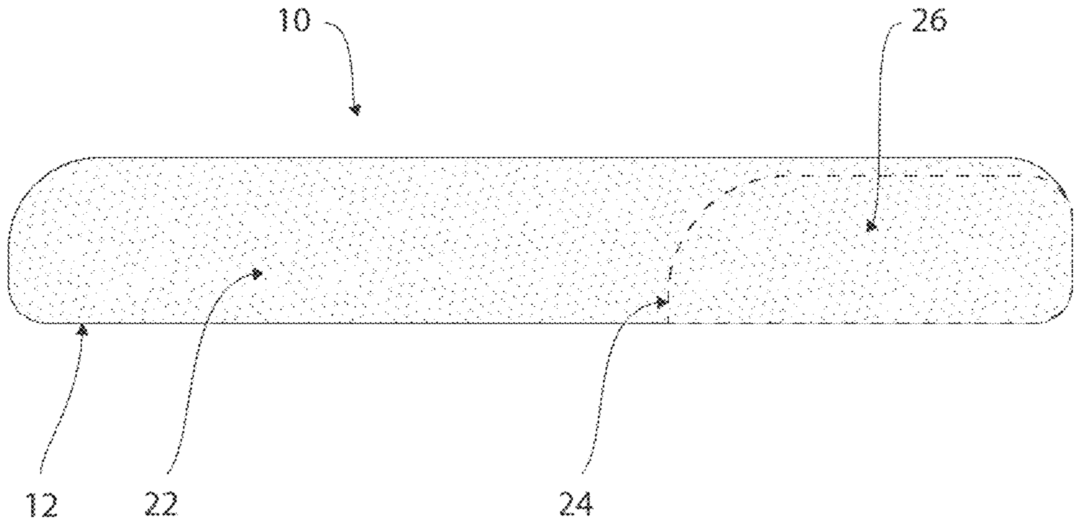
FIG. 3 shows a cross-sectional view of the vacuum patient positioning cushion taken along the line 3-3 of FIG. 2.

Referring to the cross-sectional view of FIG. 3, the gas-impermeable outer covering 12 of the patient position cushion 10 is shown. The gas-permeable bag 24 is shown positioned towards the central-superior portion of the airtight chamber 14 of the patient positioning cushion 10. Not shown for ease of illustration is the valve stem 16 which is understood in this illustration to be on the opposite side of the patient positioning cushion 10 and thus not visible in this view. It is understood that the placement of the valve stem 16 may vary without detracting from the intent of its use.

The vacuum patient positioning cushion 10 of the invention may be used to position a portion of the body of a patient, preferably the patient's head. In certain embodiments of the method of the invention, some portion of the body of the patient is placed on the vacuum patient positioning cushion 10 with the being partly or completely in an inflated condition. The gas-permeable bag 24 is positioned such that it supports the desired body part(s), preferably the head, of the patient.

The selectively closeable valve 18 of the valve stem 16 is opened to connect the airtight chamber 14 to the source of negative pressure 20, the airtight chamber 14 being evacuated while the gas-permeable bag 24 is formed to act as a headrest for the patient. The remainder of the airtight chamber 14 is evacuated while forming the filler beads 22 to conform to the patient's anatomy. The valve may then be closed to prevent fluid communication between the source of negative pressure 20 and the airtight chamber 14 to seal the patient positioning cushion 10 in the proper configuration.

In accordance with the provisions of the patent statutes, the invention has been described in what is considered to represent its preferred embodiments. However, it should be noted that the invention could be practiced otherwise than as specifically illustrated and described without departing from its spirit or scope.

What is claimed is:

1. A vacuum cushion for positioning a patient for a procedure, the vacuum cushion comprising:
- a gas-impermeable outer covering within which an airtight chamber is defined;
- a source of negative pressure;
- a vacuum control valve providing selective fluid communication between the airtight chamber and the source of negative pressure;
- a first plurality of filler beads contained within the airtight chamber and in selective fluid communication with the source of negative pressure; and
- a separate gas-permeable bag located within the airtight chamber and containing a second plurality of filler beads, the gas-permeable bag being sized, configured, and positioned so as to be useable as a customizable patient headrest.

2. The vacuum patient positioning cushion of claim 1, wherein the gas-permeable bag containing the second plurality of filler beads is in fluid communication with the airtight chamber defined by the gas-impermeable outer covering.

3. The vacuum patient positioning cushion of claim 1, wherein the gas-permeable bag is provided with at least one mesh screen that provides fluid communication with the airtight chamber defined by the gas-impermeable outer covering while retaining the second plurality of filler beads within the gas-permeable bag and preventing any of the first plurality of filler beads from entering the gas-permeable bag.

4. The vacuum patient positioning cushion of claim 1, wherein the gas-permeable bag is fixed in position within the airtight chamber.

5. The vacuum patient positioning cushion of claim 4, wherein the gas-permeable bag is permanently affixed to the outer covering to prevent it from shifting location during use.

6. The vacuum patient positioning cushion of claim 1, wherein the first plurality of filler beads comprises a plurality of polymeric beads and the second plurality of filler beads comprises a plurality of polymeric beads.

7. The vacuum patient positioning cushion of claim 1, wherein the first plurality of filler beads comprises a plurality of expanded polystyrene beads.

8. The vacuum patient positioning cushion of claim 1, wherein the second plurality of filler beads comprises a plurality of expanded polystyrene beads.

9. A method of positioning a patient for a medical procedure comprising the steps of:
- i) providing a vacuum patient positioning cushion comprising:
  - a gas-impermeable outer covering defining an airtight chamber;
  - a vacuum control valve providing selective fluid communication between the airtight chamber and a source of negative pressure;
  - a first plurality of filler beads located within the airtight chamber; and
  - a separate gas-permeable bag having a second plurality of filler beads located therein and being in fluid communication with the rest of the airtight chamber;
- ii) placing the patient atop the vacuum cushion such that the patient's head is resting atop the gas-permeable bag;
- iii) connecting the vacuum control valve to a source of negative pressure; and
- iv) evacuating the airtight chamber of the vacuum patient positioning cushion while forming the gas-permeable bag to act as a headrest for the patient and forming the first plurality of filler beads to conform to a portion of the patient's anatomy.

10. The method of claim 9, wherein the gas-permeable bag is separated from the rest of the airtight chamber defined by the gas-impermeable outer covering and the first plurality of filler beads by at least one perforated seam.

11. The method of claim 9, wherein the gas-permeable bag is fixed in position within the airtight chamber.

12. The method of claim 11, wherein the gas-permeable bag is permanently affixed to the outer covering to prevent it from shifting location during use.

13. The method of claim 9, wherein the first plurality of filler beads comprises a plurality of polymeric beads and the second plurality of filler beads comprises a plurality of polymeric beads.

14. The method of claim 9, wherein the first plurality of filler beads comprises a plurality of expanded polystyrene beads.

15. The method of claim 9, wherein the second plurality of filler beads comprises a plurality of expanded polystyrene beads.

* * * * *